United States Patent
Varisco et al.

(10) Patent No.: US 10,464,552 B2
(45) Date of Patent: Nov. 5, 2019

(54) METHOD TO CONTROL A ROAD VEHICLE WITH AN ELECTRONICALLY CONTROLLED SELF-LOCKING DIFFERENTIAL WHEN DRIVING ALONG A CURVE

(71) Applicant: Ferrari S.p.A., Modena (IT)

(72) Inventors: Stefano Varisco, Modena (IT); Fabrizio Vasta, Modena (IT)

(73) Assignee: Ferrari S.p.A., Modena (IT)

( * ) Notice: Subject to any disclaimer, the term of this patent is extended or adjusted under 35 U.S.C. 154(b) by 159 days.

(21) Appl. No.: 15/172,680

(22) Filed: Jun. 3, 2016

(65) Prior Publication Data

US 2016/0355177 A1 Dec. 8, 2016

(30) Foreign Application Priority Data

Jun. 4, 2015 (IT) .......................... 102015000020377

(51) Int. Cl.
| | |
|---|---|
| *B60K 23/04* | (2006.01) |
| *B60W 30/045* | (2012.01) |
| *B60W 10/16* | (2012.01) |
| *B60W 10/22* | (2006.01) |
| *F16H 48/28* | (2012.01) |
| *B60W 50/00* | (2006.01) |

(52) U.S. Cl.
CPC .......... *B60W 30/045* (2013.01); *B60K 23/04* (2013.01); *B60W 10/16* (2013.01); *B60W 10/22* (2013.01); *B60W 2050/0008* (2013.01); *B60W 2050/0031* (2013.01); *B60W 2520/20* (2013.01); *B60W 2550/148* (2013.01); *B60W 2710/125* (2013.01); *B60W 2710/226* (2013.01); *B60W 2720/20* (2013.01); *B60W 2720/406* (2013.01); *F16H 48/28* (2013.01)

(58) Field of Classification Search
CPC combination set(s) only.
See application file for complete search history.

(56) References Cited

U.S. PATENT DOCUMENTS

| | | | |
|---|---|---|---|
| 2006/0074530 A1* | 4/2006 | Meyers | B60G 17/016 701/1 |
| 2008/0086248 A1* | 4/2008 | Lu | B60T 8/171 701/41 |
| 2011/0106381 A1* | 5/2011 | Filev | B62D 6/007 701/40 |
| 2012/0265402 A1 | 10/2012 | Post, II et al. | |

FOREIGN PATENT DOCUMENTS

DE 10 2005 049 397 A1 4/2006

\* cited by examiner

*Primary Examiner* — Adam D Tissot
*Assistant Examiner* — Edward J Pipala
(74) *Attorney, Agent, or Firm* — Blank Rome LLP

(57) ABSTRACT

A method to control a road vehicle with an electronically controlled self-locking differential when driving along a curve; the control method includes the steps of: determining an actual attitude angle of the road vehicle; determining a desired attitude angle; and changing the locking of the self-locking differential based on the difference between the actual attitude angle and the desired attitude angle.

14 Claims, 3 Drawing Sheets

METHOD TO CONTROL A ROAD VEHICLE WITH AN ELECTRONICALLY CONTROLLED SELF-LOCKING DIFFERENTIAL WHEN DRIVING ALONG A CURVE

TECHNICAL FIELD

The present invention relates to a method to control a road vehicle with an electronically controlled self-locking differential when driving along a curve.

PRIOR ART

Patent application WO2004087453A1 describes a road vehicle with an electronically controlled self-locking differential, whose locking percentage is controlled by a control unit to try and stabilise (in other words render more stable and therefore safer) the road vehicle.

In accordance with the description in patent application WO2004087453A1, when driving along a curve, the control unit gradually increases the locking percentage of the self-locking differential (in other words "closes" the clutch of the self-locking differential, and transfers a greater quantity of torque towards the driving wheel that turns more slowly, in other words towards the inner wheel on the curve) in the event of releasing the accelerator pedal to stabilise the road vehicle.

In accordance with the description in patent application WO2004087453A1, when driving along a curve, the control unit gradually reduces the locking percentage of the self-locking differential (in other words "opens" the clutch of the self-locking differential, and transfers a greater quantity of torque towards the driving wheel that turns more quickly, in other words towards the outer wheel on the curve) in the event of pressure (sunk) of the accelerator pedal, to improve both the stability of the road vehicle and the accelerating performance on the curve; in particular, the reduction in the locking percentage of the self-locking differential is proportionate to the lateral acceleration of the road vehicle, to the running speed of the road vehicle, to the torque supplied by the engine, and/or to the gear selected.

In accordance with the description in patent application WO2004087453A1, when driving along a curve at a substantially constant speed, the control unit estimates the grip capacity of the driving wheels to the road surface, and consequently cancels the locking percentage of the self-locking differential when the grip capacity of the driving wheels to the road surface is far from the grip limit, gradually increases the locking percentage of the self-locking differential when the grip capacity of the driving wheels to the road surface approaches the grip limit and then reduces the locking percentage of the self-locking differential to the zero value when the grip capacity of the driving wheels to the road surface is close to the grip limit.

Patent application DE102005049397A1 describes the action on the locking of the self-locking differential to stabilise the vehicle; in particular, the paragraph [0056] describes the identification (by means of a vehicle reference model) of a desired yaw moment (that is, the rate of change of the yaw angle, in other words the first derivative in time of the yaw angle), which increases the stability of the vehicle contrasting understeer or oversteer, and the pursuit of the desired yaw moment using the yaw moment error (in other words the difference between the desired yaw moment and the actual yaw moment) as the feedback variable to be cancelled. In this respect, it is important to point out that the yaw angle is the angle comprised between the longitudinal axis of the vehicle and a fixed ground reference, and that the actual yaw moment is measured with a gyrometer positioned near the centre of gravity of the vehicle.

The aforesaid method to control the locking percentage of the self-locking differential allows the road vehicle to be stabilised (in other words rendered more stable and therefore safer) in all driving conditions on a curve; however, the aforesaid method to control the locking percentage of the self-locking differential does not allow performance to be maximised, in other words it doesn't allow the driving speed to be maximized on a curve. In other words, the aforesaid method to control the locking percentage of the self-locking differential tends to be precautionary, or rather it privileges the stability of the road vehicle penalizing performance.

DESCRIPTION OF THE INVENTION

It is the object of the present invention to propose a method to control a road vehicle with an electronically controlled self-locking differential when driving along a curve, said control method being without the aforesaid inconveniences, being cheap and easy to make, and in particular allowing performance to be maximised when driving along a curve, without making the road vehicle unstable.

According to the present invention, a method is proposed to control a road vehicle with an electronically controlled self-locking differential when driving along a curve, in accordance with the appended claims.

BRIEF DESCRIPTION OF THE DRAWINGS

The present invention will now be described with reference to the accompanying drawings, which illustrate a non-limiting embodiment, wherein.

PREFERRED EMBODIMENTS OF THE INVENTION

Figure 1:
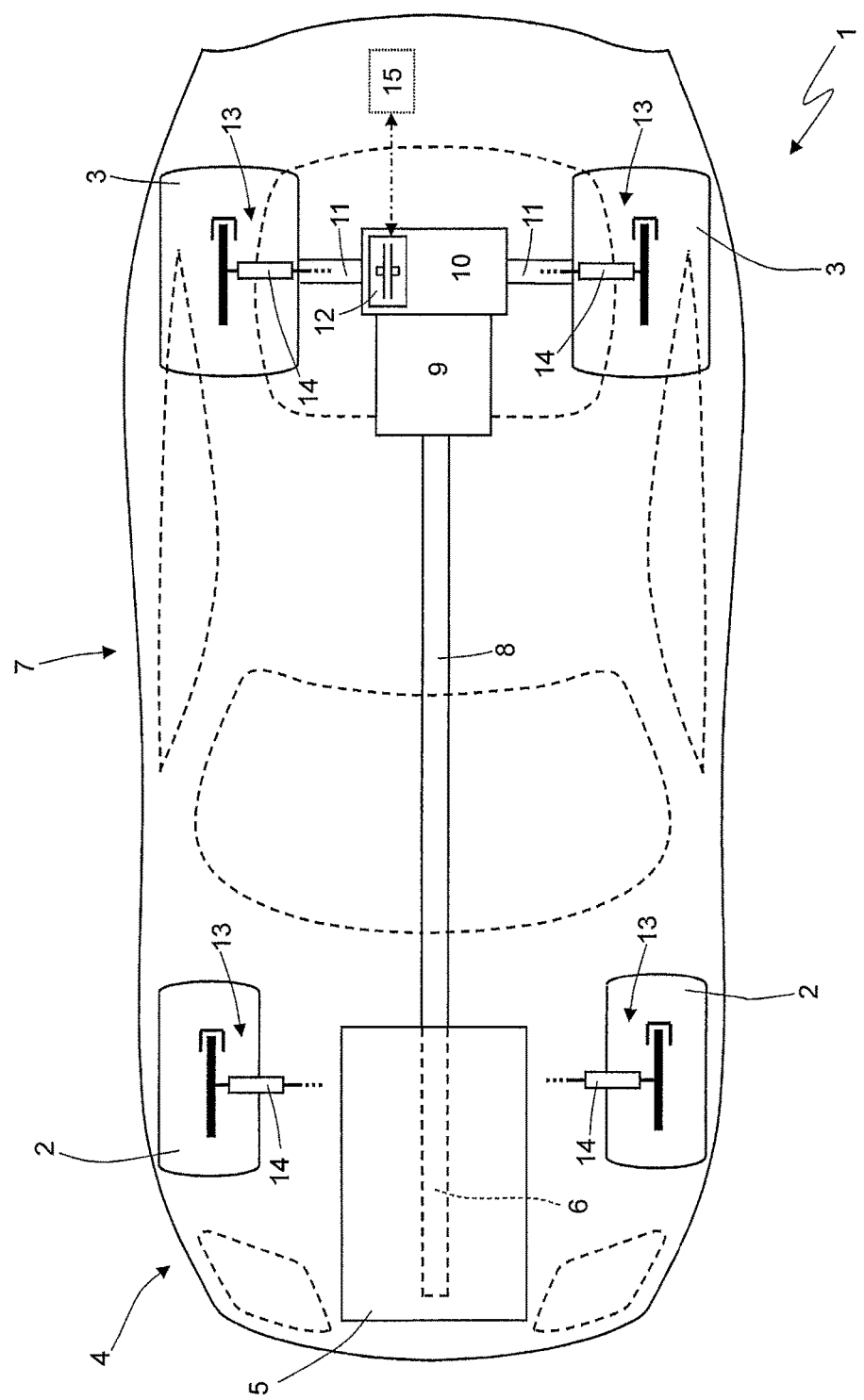
FIG. 1 shows a schematic, plan view of a road vehicle with an electronically controlled self-locking differential that is controlled according to the present invention.

In FIG. 1, numeral 1 globally designates a road vehicle fitted with two front wheels 2 and two rear driving wheels 3 that receive the torque from a motor propulsion system 4.

The motor propulsion system 4 comprises an internal combustion thermal engine 5, which is placed in a longitudinal front position and is fitted with a motor shaft 6, and an automated manual transmission 7 (commonly called "AMT"), which transmits the torque generated by the internal combustion engine 5 to the rear driving wheels 3 and exhibits a so-called "transaxle" configuration. The transmission 7 comprises a drive shaft 8 that is connected on the one side to the motor shaft 6 and on the other, it is connected mechanically to a transmission 9, which is fitted with at least one clutch and is placed in a rear longitudinal position. An electronically controlled self-locking differential 10 is connected in cascade to the transmission 9, from which branch off a pair of semi-axles 11, each of which is integral with a respective rear driving wheel 3. The electronically controlled self-locking differential 10 comprises a boxed body, a bevel gear that is housed inside the boxed body and transmits the torque to the two semi-axles 11, and an adjustable lock-up clutch 12 for locking a semi-axle 11 in relation to the boxed body. When the lock-up clutch 12 is completely open (in other words the locking percentage is equal to zero), the self-locking differential 10 is completely free and the torque is equally distributed between the two rear driving wheels 3 (in other words each rear driving wheel 3 receives 50% of the overall torque independently of its turning speed); by closing the lock-up clutch 12 (in other words by increasing the locking percentage), the self-locking differential 10 starts to lock and the torque is gradually increased towards the rear driving wheel 3 that turns more slowly (in other words the rear driving wheel 3 that turns more slowly receives more torque compared to the rear driving wheel 3 that turns more quickly).

Each wheel 2 or 3 is mechanically connected to a frame of the road vehicle 1 by means of a suspension 13 (partially illustrated in FIG. 1), which is fitted with an electronically controlled shock absorber 14, in other words with an electric actuator that makes it possible to change (in other words increase or decrease) the damping of the electronically controlled shock absorber 14. By way of example, the electric actuator of each electronically controlled shock absorber 14 could comprise one or more solenoid valves that modulate the size of passage holes for the oil inside the electronically controlled shock absorber 14, or it could comprise magneto-rheological fluid that alters its physical properties based on an applied magnetic field.

The road vehicle 1 comprises an electronic control unit 15 ("ECU"), which regulates the behaviour of the road vehicle 1, amongst other things, when driving along a curve acting, as subsequently described in greater detail, on the self-locking differential 10 (in other words on the lock-up clutch 12 of the self-locking differential 10) and on the shock absorbers 14 of the suspensions 13. Physically, the control unit 15 can be comprised of a single device or several separate devices, which communicate through the CAN network of the road vehicle 1.

Figure 2:
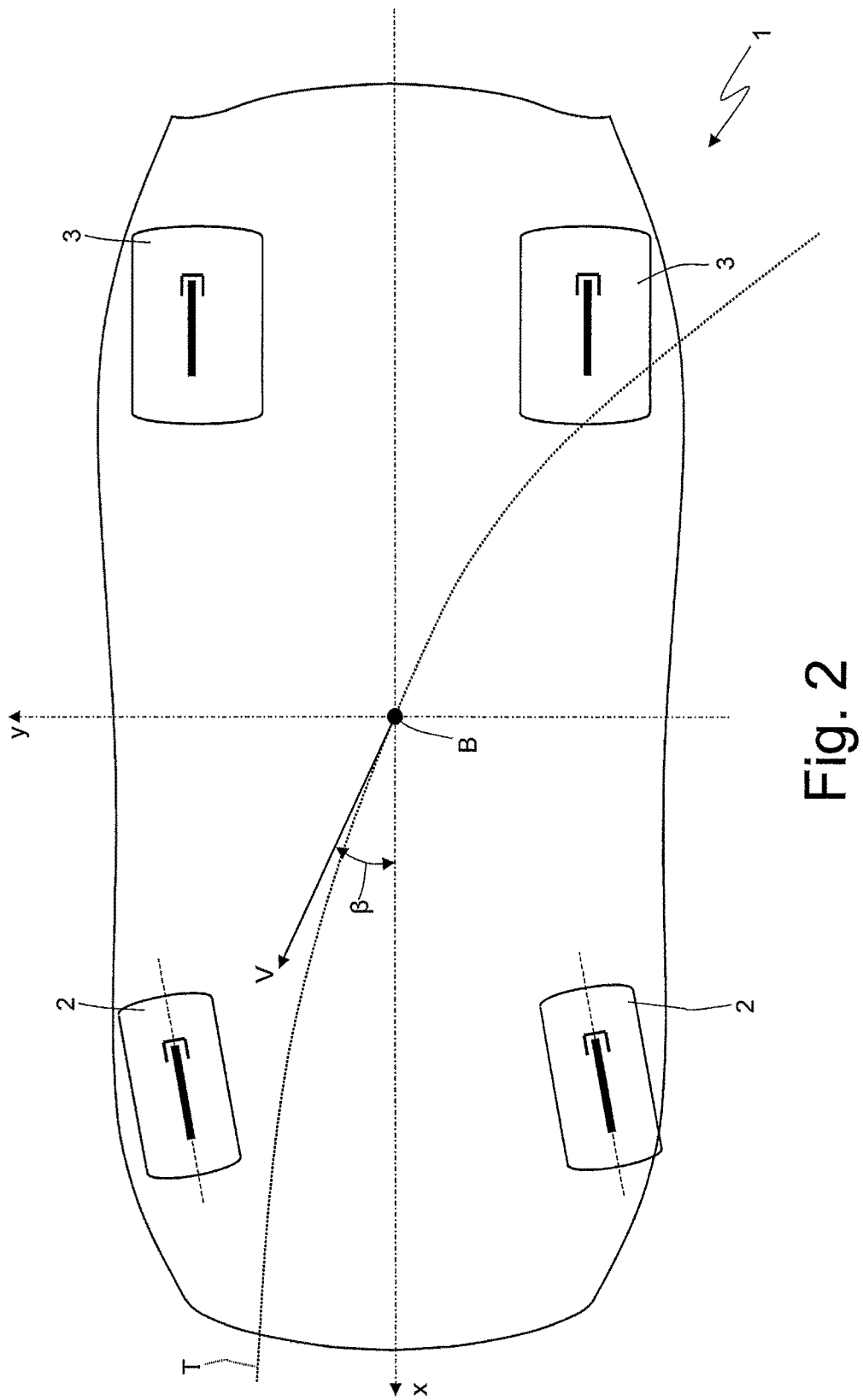
FIG. 2 shows a schematic view of the road vehicle of FIG. 1 when driving along a curve highlighting the trajectory, the running speed and the attitude angle.

In accordance with the illustration in FIG. 2, when driving along a curve, the control unit 15 determines, in a known manner, the actual attitude angle $\beta$ of the road vehicle 1 (in other words the angle comprised between the longitudinal axis x of the road vehicle 1 and the direction of the running speed V of the road vehicle 1 in the centre of gravity B). It is important to note that the attitude angle $\beta$ is different from the yaw angle (in other words the angle comprised between the longitudinal axis x of the road vehicle 1 and a fixed ground reference), as the road vehicle 1 can take on the same yaw angle in the plan, assuming even very different attitude angles $\beta$, and vice versa.

By way of example, the control unit 15 estimates the trajectory T followed by the road vehicle 1 using the measurements supplied, in real time, by a triaxial gyroscope and by a satellite positioner; in particular, the trajectory T is determined by integrating the accelerations, twice in time, measured by the triaxial gyroscope, and the measurements supplied by the satellite positioner are used to cyclically cancel the position errors that occur during the integration process. Furthermore, the control unit 15 estimates the running speed V of the road vehicle 1 in the centre of gravity B using the measurements supplied, in real time, by the triaxial gyroscope; in particular, the speed V of the road vehicle 1 in the centre of gravity B is determined by integrating the accelerations, once in time, measured by the triaxial gyroscope (checking that the running speed V of the road vehicle 1 in the centre of gravity B is actually tangent to the trajectory T followed by the road vehicle 1, otherwise, in the event of a significant variation, at least one more iteration of the calculation is made, correcting the parameters used).

When driving along a curve, the control unit 15 determines the actual (real) attitude angle $\beta$ of the road vehicle 1 in real time (for example as described previously). Moreover, when driving along a curve, the control unit 15 determines a desired (optimum) attitude angle $\beta_{TGT}$ that enables performance to be maximised (in other words the curve driving speed), while keeping the road vehicle 1 in stable conditions (in other words in absolute safety).

In accordance with a possible (but not binding) embodiment, the control unit 15 cyclically (for example with a frequency of at least a few dozen Hz) estimates (in a known manner) the grip of the wheels 2 and 3 to the road surface, determines a bending radius of the trajectory T of the road vehicle 1 (in other words determines a degree of bending of the trajectory T), and determines a running speed V of the road vehicle 1. Based on the grip of the wheels 2 and 3 (therefore on the stability of the road vehicle 1), on the bending radius of the trajectory T and on the running speed V, the control unit 15 cyclically determines the desired attitude angle $\beta_{TGT}$; in particular, in order to determine the desired attitude angle $\beta_{TGT}$, the control unit 15 can use a predetermined map (normally established experimentally during the design and tuning phase of the road vehicle 1 and memorised in a memory) or a mathematical model of the road vehicle 1.

When driving along a curve, the control unit 15 establishes an initial value (starting point), in an open loop, of the locking of the self-locking differential 10 based on the desired attitude angle $\beta_{TGT}$ and subsequently corrects the locking of the self-locking differential 10, if necessary, based on the difference between the actual attitude angle $\beta$ and the desired attitude angle $\beta_{TGT}$. In particular, the control unit 15 varies the locking of the self-locking differential 10 using a feedback control that uses the actual attitude angle $\beta$ as the feedback variable.

Consequently, the control unit 15 cyclically changes the locking of the self-locking differential 10 based on the difference between the actual attitude angle $\beta$ and the desired attitude angle $\alpha_{TGT}$: the locking of the self-locking differential 10 is reduced if the actual attitude angle $\beta$ is less than the desired attitude angle $\beta_{TGT}$, the locking of the self-locking differential 10 is kept constant if the actual attitude angle $\beta$ is the same (considering a certain tolerance of course) as the desired attitude angle $\beta_{TGT}$, and the locking of the self-locking differential 10 is increased if the actual attitude angle $\beta$ is greater than the desired attitude angle $\beta_{TGT}$. The methods of changing the locking of the self-locking differential 10 in relation to the control error (in other words to the difference between the actual attitude angle $\beta$ and the desired attitude angle $\beta_{TGT}$) can follow the classical PID (Proportional-Integral-Derivative) control method.

In accordance with a preferred, though non-binding embodiment, when the actual attitude angle $\beta$ is within a predetermined neighbourhood of the desired attitude angle $\beta_{TGT}$ (in other words when the absolute value of the difference between the actual attitude angle $\beta$ and the desired attitude angle $\beta_{TGT}$ is lower than a predetermined threshold), the control unit 15 for controlling the actual attitude angle $\beta$ no longer acts on the locking of the self-locking differential 10, but it only acts (subsequently described in further detail) on the damping (in other words on the calibration) of the electronically controlled shock absorbers 14 of the suspensions 13. In other words, when the actual attitude angle β is within a neighbourhood of the desired attitude angle $β_{TGT}$, in order to control the actual attitude angle β, the damping (in other words the calibration) of the shock absorbers 14 is changed and the locking of the self-locking differential 10 is not changed; whereas, when the actual attitude angle β is outside the neighbourhood of the desired attitude angle $β_{TGT}$, in order to control the actual attitude angle β, the damping (in other words the calibration) of the shock absorbers 14 is not changed and the locking of the self-locking differential 10 is changed.

The control unit 15 calculates the rate β' of change of the actual attitude angle β deriving the actual attitude angle β in time, and changes the damping (in other words the calibration) of the electronically controlled shock absorbers 14 based on the rate β' of change of the actual attitude angle β. In other words, based on the rate β' of change of the actual attitude angle β, the control unit 15 changes the damping (in other words the calibration) of the electronically controlled shock absorbers 14 to make the electronically controlled shock absorbers 14 stiffer (harder, in other words with reduced damping) or more flexible (softer, in other words with increased damping).

If the rate β' of change of the actual attitude angle β is negative (and preferably with an absolute value greater than a corresponding threshold), in other words it tends to decrease the actual attitude angle β, the shock absorbers 14 of the rear suspensions 13 are stiffened (that is, they are made stiffer) and, if necessary, the shock absorbers 14 of the front suspensions 13 are made softer. In other words, in the case of a rate β' of negative change of an actual attitude angle β, the rear axle of the road vehicle 1 is stiffened and, if necessary, the front axle of the road vehicle 1 is made softer to improve the dynamic behaviour of the self-locking differential 10. Alternatively, in the case of a rate β' of negative change of the actual attitude angle β, the damping of the front axle of the road vehicle 1 is not modified.

If the rate β' of change of the actual attitude angle β is positive (and preferably with an absolute value greater than a corresponding threshold), in other words it tends to increase the actual attitude angle β, the shock absorbers 14 of the rear suspensions 13 are made softer and, if necessary, the shock absorbers 14 of the front suspensions 13 are stiffened (in other words they are made stiffer). In other words, in case of a rate β' of change of the positive actual attitude angle β, the rear axle of the road vehicle 1 is made softer and the front axle of the road vehicle 1 is stiffened (in other words made stiffer) to stabilise the road vehicle 1. Alternatively, in the case of a rate β' of positive change of the actual attitude angle β, the damping of the front axle of the road vehicle 1 is not modified.

Figure 3:
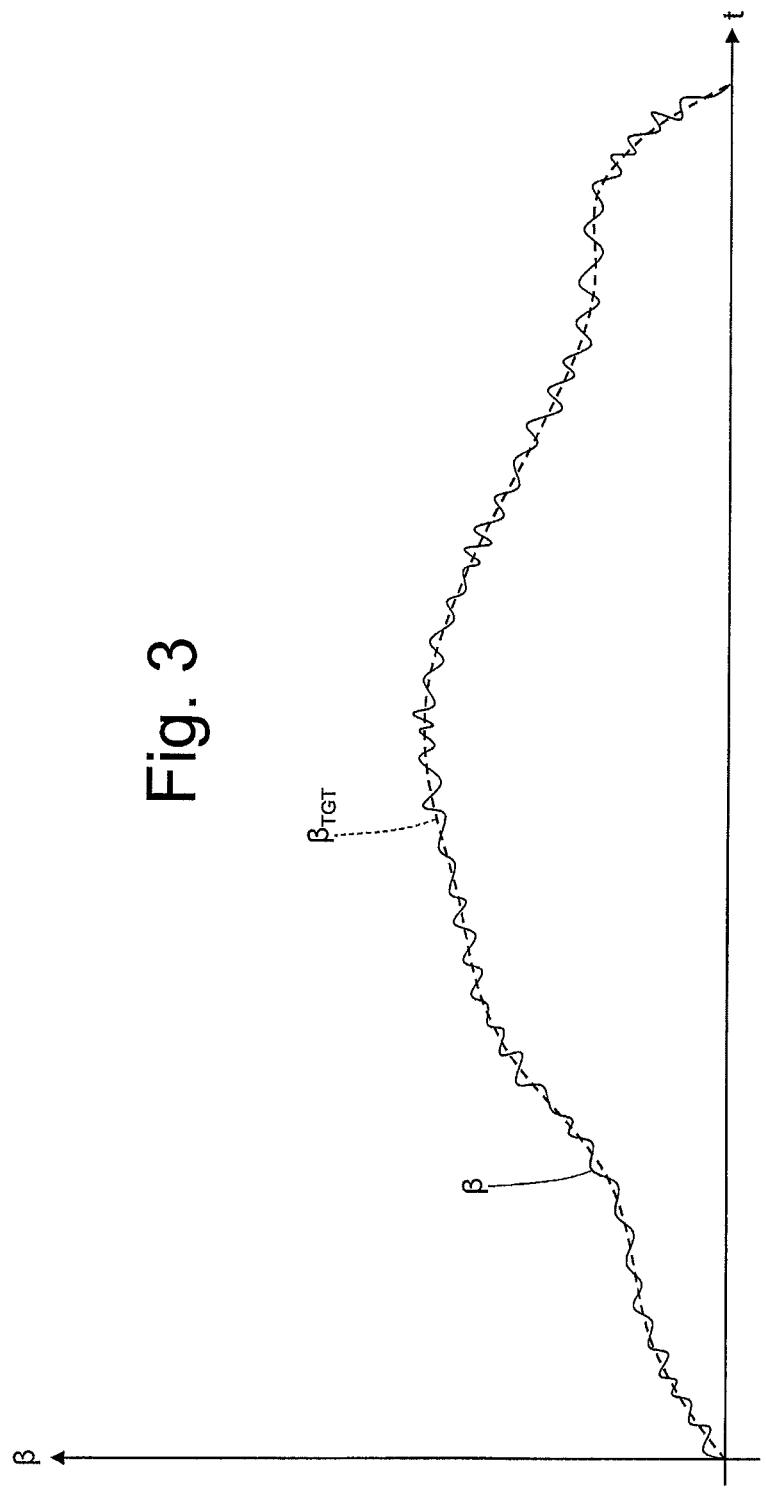
FIG. 3 represents a diagram that shows the development, in time, of the actual attitude angle and the desired attitude angle when driving along a curve.

In summary, the control unit 15 brings the actual attitude angle β into a neighbourhood of the desired attitude angle $β_{TGT}$, acting on the locking of the self-locking differential 10; when the actual attitude angle β is in a neighbourhood of the desired attitude angle $β_{TGT}$, the control unit 15 keeps the actual attitude angle β in the neighbourhood of the desired attitude angle $β_{TGT}$, acting on the damping of the electronically controlled shock absorbers 14 (which have a rapid effect on maintaining the actual attitude angle β, as they conform to the rate β' of change of the actual attitude angle β itself). The result of the above description is shown in the diagram of FIG. 3, where you can see the trend, over time, of the actual attitude angle β (in a continuous line) and the desired attitude angle $β_{TGT}$ (in a dotted line) when driving along a curve (at the start and at the end of the curve the road vehicle 1 is facing parallel to its trajectory T and so at the start and at the end of the curve the actual attitude angle β is null); note how the actual attitude angle β fluctuates rather rapidly around the desired attitude angle $β_{TGT}$ as a consequence of the action on the damping of the electronically controlled shock absorbers 14.

The above described control method presents numerous advantages.

Firstly, the above described control method allows performance to be maximized when driving along a curve (in other words it allows the curve driving speed to be maximised) without making the road vehicle 1 unstable (in other words moving closer to the stability limit of the road vehicle 1 while maintaining an adequate safety margin).

Moreover, the above described control method is particularly safe, as the road vehicle 1 is always kept under control and allows any necessary intervention to be carried out rapidly and efficiently.

Finally, the above described control method is cheap and easy to implement on a road vehicle 1 with an electronically controlled self-locking differential, as it doesn't require the addition of any physical components (in other words the hardware system is not modified in any way) but it can be made completely using software. It is important to note that the above described control method doesn't require a high calculation capacity or a great amount of memory and so it can be implemented in a known control unit without requiring updates or enhancements.

The invention claimed is:

1. A method to maximize driving speed of a road vehicle with an electronic control unit communicating via a controller area network to an electronically controlled self-locking differential when driving along a curve and without making the vehicle unstable;

wherein the road vehicle comprises two driving wheels and the self-locking differential comprises a pair of semi-axles, each of which is integral with a respective driving wheel;

wherein the control method comprises the steps of:

determining, by using a sensor, an actual attitude angle (β) of the road vehicle, where the actual attitude angle (β) is the angle between the longitudinal axis of the road vehicle and the direction of the running speed of the road vehicle in the center of gravity;

determining, using the electronic control unit, a desired attitude angle ($β_{TGT}$) that enables vehicle speed to be maximized while keeping the road vehicle in stable condition by:

determining a bending radius of a trajectory (T) of the road vehicle;

determining a running speed of the road vehicle; and determining the desired attitude angle ($β_{TGT}$) using a predetermined map or a mathematical model of the road vehicle and based on the bending radius of the trajectory (T) and the running speed;

communicating from the electronic control unit through the controller area network to the self-locking differential a change in the locking percentage based on the difference between the actual attitude angle (β) and the desired attitude angle ($β_{TGT}$); and varying the amount of locking percentage in the self-locking differential.

2. A control method according to claim 1, wherein:

the locking of the self-locking differential is reduced if the actual attitude angle (β) is smaller than the desired attitude angle ($β_{TGT}$);

the locking of the self-locking differential is kept constant if the actual attitude angle (β) is the same as the desired attitude angle ($β_{TGT}$); and the locking of the self-locking differential is increased if the actual attitude angle (β) is greater than the desired attitude angle ($β_{TGT}$).

3. A control method according to claim 1, wherein the locking of the self-locking differential is changed using a feedback control, which employs the actual attitude angle (β) as the feedback variable.

4. A control method according to claim 1, wherein the step of determining the desired attitude angle ($β_{TGT}$) comprises the further step of estimating the grip of the wheels of the road vehicle.

5. A control method according to claim 1 and comprising the further steps of:
calculating the rate (β') of change of the actual attitude angle (β) by calculating the time derivative of the actual attitude angle (β); and
changing the damping of electronically controlled shock absorbers of suspensions of the road vehicle based on the rate (β') of change of the actual attitude angle (β).

6. A control method according to claim 5, wherein the damping of the shock absorbers is changed only when the actual attitude angle (β) is close to the desired attitude angle ($β_{TGT}$).

7. A control method according to claim 6, wherein:
in the case of changing the damping of the shock absorbers, the locking of the self-locking differential is not changed; and
in the case of changing the locking of the self-locking differential, the damping of the shock absorbers is not changed.

8. A control method according to claim 5, wherein:
when the actual attitude angle (β) is in a neighborhood of the desired attitude angle ($β_{TGT}$), the damping of the shock absorbers is changed and the locking of the self-locking differential is not changed; and
when the actual attitude angle (β) is outside a neighborhood of the desired attitude angle ($β_{TGT}$) the damping of the shock absorbers is not changed and the locking of the self-locking differential is changed.

9. A control method according to claim 5, wherein, if the rate (β') of change of the actual attitude angle (β) is negative, such that the actual attitude angle (β) decreases, the shock absorbers of the rear suspensions are stiffened.

10. A control method according to claim 9, wherein, if the rate (β') of change of the actual attitude angle (β) is negative, such that the actual attitude angle (β) decreases, the shock absorbers of the front suspensions are softened.

11. A control method according to claim 5, wherein, if the rate (β') of change of the actual attitude angle (β) is positive, such that the actual attitude angle (β) increases, the shock absorbers of the rear suspensions are softened.

12. A control method according to claim 11, wherein, if the rate (β') of change of the actual attitude angle (β) is positive, such that the actual attitude angle (β) increases, the shock absorbers of the front suspensions are stiffened.

13. A control method according to claim 1, wherein an initial value of the locking of the self-locking differential is established, in an open loop, based on the desired attitude angle ($β_{TGT}$) and the locking of the self-locking differential is subsequently corrected based on the difference between the actual attitude angle (β) and the desired attitude angle ($β_{TGT}$).

14. An electronic control unit to control a road vehicle with an electronically controlled self-locking differential when driving along a curve to maximize driving speed without making the vehicle unstable;
wherein the road vehicle comprises two driving wheels and the self-locking differential comprises a pair of semi-axles, each of which is integral with a respective driving wheel;
wherein the electronic control unit comprises a sensor, including a triaxial gyroscope, for determining an actual attitude angle (β) of the road vehicle, where the actual attitude angle (β) is the angle between the longitudinal axis of the road vehicle and the direction of the running speed of the road vehicle in the center of gravity;
wherein the electronic control unit determines a desired attitude angle ($β_{TGT}$) that enables vehicle speed to be maximized while keeping the road vehicle in stable condition by:
determining a bending radius of a trajectory (T) of the road vehicle;
determining a running speed of the road vehicle; and
determining the desired attitude angle ($β_{TGT}$) using a predetermined map or a mathematical model of the road vehicle and based on the bending radius of the trajectory (T) and the running speed; and
wherein the electronic control unit is connected to the electronically controlled self-locking differential to change the locking of the self-locking differential based on the difference between the actual attitude angle (β) and the desired attitude angle ($β_{TGT}$).

* * * * *